United States Patent
Li et al.

(10) Patent No.: US 10,067,594 B2
(45) Date of Patent: Sep. 4, 2018

(54) METHOD AND DEVICE FOR CONTROLLING TOUCH SCREEN

(71) Applicant: Xiaomi Inc., Beijing (CN)

(72) Inventors: Guosheng Li, Beijing (CN); Anyu Liu, Beijing (CN); Dongdong Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 73 days.

(21) Appl. No.: 15/083,475

(22) Filed: Mar. 29, 2016

(65) Prior Publication Data
US 2017/0045987 A1  Feb. 16, 2017

(30) Foreign Application Priority Data

Aug. 12, 2015 (CN) .......................... 2015 1 0493149

(51) Int. Cl.
  G06F 3/041 (2006.01)
  G06F 3/042 (2006.01)
  G06F 3/044 (2006.01)
  G09G 3/34 (2006.01)

(52) U.S. Cl.
  CPC ............ G06F 3/0416 (2013.01); G06F 3/042 (2013.01); G06F 3/044 (2013.01); G09G 3/3406 (2013.01); G09G 2320/0626 (2013.01); G09G 2360/144 (2013.01)

(58) Field of Classification Search
CPC combination set(s) only.
See application file for complete search history.

(56) References Cited

U.S. PATENT DOCUMENTS

| 7,009,663 B2 | 3/2006 | Abileah et al. |
| 9,086,796 B2 | 7/2015 | Tsudik |
| 2005/0051708 A1 | 3/2005 | Hotelling |
| 2007/0216637 A1 | 9/2007 | Ito |
| 2009/0085485 A1 | 4/2009 | Young |
| 2010/0134443 A1 | 6/2010 | Nakamura |
| 2013/0076712 A1 | 3/2013 | Zheng et al. |
| 2013/0106813 A1 | 5/2013 | Hotelling et al. |
| 2014/0132578 A1 | 5/2014 | Zheng |
| 2014/0340348 A1 | 11/2014 | Park |

FOREIGN PATENT DOCUMENTS

| CN | 201699857 U | 1/2011 |
| CN | 103731518 A | 4/2014 |
| CN | 103946917 A | 7/2014 |
| CN | 104345876 A | 2/2015 |

(Continued)

OTHER PUBLICATIONS

English Translation of International Search Report dated May 11, 2016 for International Application No. PCT/CN2015/098860, 4 pages.

(Continued)

*Primary Examiner* — Van N Chow
(74) *Attorney, Agent, or Firm* — Brinks, Gilson & Lione

(57) ABSTRACT

The present disclosure relates to a method and device for controlling brightness of a touch screen of an electronic device. The method includes determining an object is operating on the touch screen; selecting a number N of sampling light sensors which are not blocked by an object from ambient light among the light sensors distributed on the touch screen, and controlling brightness of the touch screen based on the number N of sampling light sensors.

14 Claims, 6 Drawing Sheets

(56) References Cited

FOREIGN PATENT DOCUMENTS

| | | | |
|---|---|---|---|
| CN | 104484032 A | 4/2015 | |
| CN | 104517585 A | 4/2015 | |
| CN | 104765422 A | 7/2015 | |
| CN | 105094465 A | 11/2015 | |
| CN | 105094466 A | 11/2015 | |
| CN | 105094616 A | 11/2015 | |
| JP | 2005-352490 A | 12/2005 | |
| JP | 2007-248815 A | 9/2007 | |
| JP | 2009-146173 A | 7/2009 | |
| JP | 2009-157605 A | 7/2009 | |
| JP | 2010-055578 A | 3/2010 | |
| JP | 2010-097160 A | 4/2010 | |
| JP | 2012-248974 A | 12/2012 | |
| JP | 2013-145388 A | 7/2013 | |
| JP | 2014-107153 A | 6/2014 | |
| RU | 2 379 747 C2 | 1/2010 | |

OTHER PUBLICATIONS

Extended European Search Report dated Dec. 7, 2016 for European Application No. 16167777.8, 6 pages.
Office Action dated Sep. 18, 2017 for Chinese Application No. 201510493149.2, 8 pages.
Office Action dated Sep. 19, 2017 for Japanese Application No. 2017-533680, 4 pages.
Office Action dated May 17, 2017 for Korean Application No. 10-2016-7004836, 7 pages.
Office Action dated Jul. 19, 2017 for Russian Application No. 2016109777/08, 12 pages.
International Search Report dated May 11, 2016 for International Application No. PCT/CN2015/098860, 5 pages.
Decision to Grant dated Mar. 27, 2018 for Japanese Application No. 2017-533680, 3 pages.
Office Action dated Apr. 10, 2018 for Chinese Application No. 201510493149.2, 7 pages.

METHOD AND DEVICE FOR CONTROLLING TOUCH SCREEN

CROSS-REFERENCE TO RELATED APPLICATIONS

This application is based upon and claims priority to Chinese Patent Application No. 201510493149.2, filed Aug. 12, 2015, the entire contents of which are incorporated herein by reference.

TECHNICAL FIELD

The present disclosure relates to the field of electronics, and more particularly, to a method and device for controlling a touch screen.

BACKGROUND

Light sensors are now widely applied in electronic devices such as a mobile phone, a tablet computer and a laptop computer or the like. Generally, the top edge on the front side of the housing of an electronic device is provided with a small hole in which a light sensor is disposed. When ambient light produced by a light source passes through the small hole and reaches the light sensor, the electronic device may measure the brightness value of the ambient light by the light sensor.

SUMMARY

Embodiments of the present disclosure provide a method and device for controlling a touch screen.

According to a first aspect of embodiments of the present disclosure, there is provided a method for controlling a touch screen of an electronic device containing a number X of ambient light sensors, where X is a natural number greater than two and the number X of ambient light sensors are disposed in an array. The method includes determining whether an object is operating on the touch screen, determining a number N of sampling light sensors which are not blocked by the object from receiving ambient light, and controlling the brightness of the touch screen based on the N sampling light sensors.

According to a second aspect of embodiments of the present disclosure, there is provided a device for controlling brightness of a touch screen of the device, including a touch screen on which light sensors are disposed, a processor, and a memory for storing instructions executable by the processor. The processor is configured to determine whether an object is operating on the touch screen, determine a number N of sampling light sensors which are not blocked by the object from receiving ambient light among the light sensors disposed on the touch screen, and control brightness of the touch screen based on the number N of sampling light sensors.

According to a third aspect of embodiments of the present disclosure, there is provided a non-transitory computer-readable storage medium having stored therein instructions that, when executed by a processor of an electronic device, causes the electronic device to perform a method for controlling brightness of a touch screen of the electronic device. The method includes determining whether an object is operating on the touch screen, determining a number N of sampling light sensors which are not blocked by the object from receiving ambient light, and controlling brightness of the touch screen based on the number N of sampling light sensors.

It is to be understood that both the foregoing general description and the following detailed description are exemplary and explanatory only and are not restrictive of the invention, as claimed

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
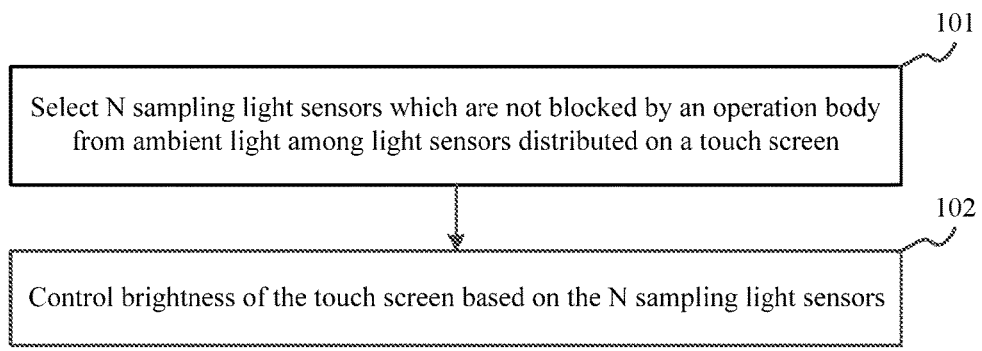
FIG. 1 is a flow chart showing a method for controlling a touch screen, according to an exemplary embodiment.

FIG. 1 is a flow chart showing a method for controlling brightness of a touch screen, according to an exemplary embodiment. The method for controlling brightness of a touch screen is applied in an electronic device including a touch screen on which light sensors are distributed. As shown in FIG. 1, the method for controlling a touch screen includes the following steps.

In step 101, N sampling sensors which are not blocked by an operation body from ambient light are selected from the light sensors distributed on the touch screen. N is an integer greater than 1.

In step 102, the brightness of the touch screen is controlled based on the N sampling sensors.

In view of the above, in the method for controlling brightness of a touch screen provided by the present disclosure, N sampling sensors which are not blocked by an operation body from ambient light are selected from the light sensors distributed on the touch screen, and the touch screen is controlled according to the N sampling sensors. The brightness value of ambient light can be calculated according to the N accurate measurement values, and the touch screen is controlled according to the brightness value. Therefore, the present disclosure solves the problem that it is easy for one light sensor disposed in a small hole to be blocked and thereby the inaccurate measurements on the brightness value of the ambient affects the control on the touch screen. Consequently, the present disclosure can improve the accuracy in screen control.

Figure 2A:
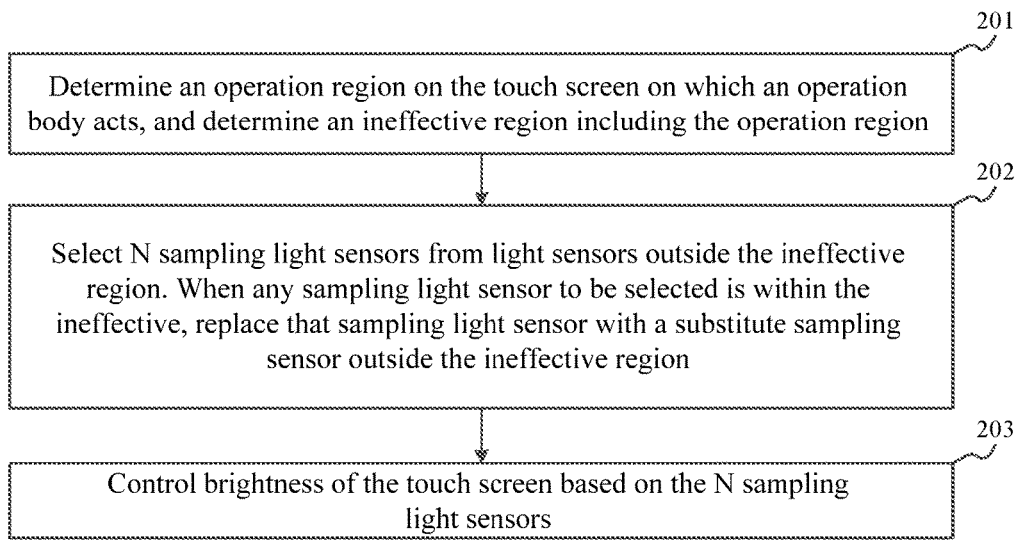
FIG. 2A is a flow chart showing a method for controlling a touch screen, according to another exemplary embodiment.

FIG. 2A is a flow chart showing a method for controlling a touch screen, according to another exemplary embodiment. The method for controlling a touch screen is applied in an electronic device including a touch screen on which light sensors are evenly distributed. As shown in FIG. 2A, the method for controlling a touch screen includes the following steps.

In step 201, an operation region on the touch screen which an operation body, for example, a finger acts on is determined, and an ineffective region including the operation region is determined. The ambient light incident into light sensors in the ineffective region is blocked by the operation body.

Figure 2B:
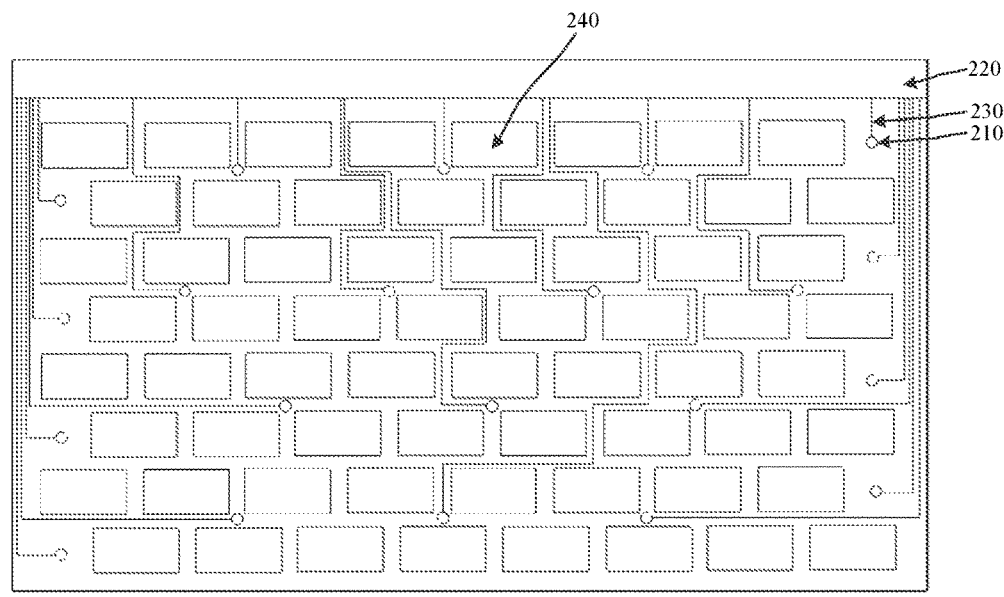
FIG. 2B is a schematic diagram showing distribution of light sensors, according to another exemplary embodiment.

In the embodiment, light sensors are evenly distributed on the touch screen. Referring to a schematic diagram showing the distribution of the light sensors as shown in FIG. 2B, the dots represent light sensors 210, the rectangle on the top represent a control chip 220, lines represent wires 230, and respective rectangles distributed below represent pixel color blocks 240. Each light sensor 210 is connected to the control chip 220 via a wire 230.

Because a plurality of light sensors are distributed on the touch screen, measuring the ambient light by all the light sensors can consume many resources, and thus an electronic device may select N light sensors among all the light sensors to sample and measure the brightness value of ambient light according to the sampling sensors. During selection of the N sampling sensors, if a user performs a touch operation on the touch screen, the electronic device may sense the touch operation acted by the operation body on the touch screen. The operation body may either be a finger or palm of the user, or may be other portions of the user, which will not be defined in the embodiment.

A plurality of touch units are evenly distributed on the touch screen. When the touch operation is acted on the touch screen, the capacitance values of the touch units covered by the touch operation will change, and the electronic device determines a region formed by the touch units the capacitance values of which change as the operation region on the touch operation. In the embodiment, the touch units, the capacitance values of which change, are called as contacts.

The operation body contacts the operation region, and thus, for the light sensors within the operation region, the ambient light which is supposed to reach these light sensors are blocked by the operation body, and measurement values of these light sensors are not the actual brightness values of the ambient light. As a result, the accuracy in measuring the brightness value of ambient light is affected. Moreover, when the light source is located above the electronic device, the operation body can form a shadow on the touch screen because of irradiation of the ambient light on the operation body, and measurement values of the light sensors in the shadow are not the actual brightness values of the ambient light, and this will also affect the accuracy in measuring the brightness value of ambient light. Therefore, when measuring the brightness value of ambient light, it is desirable to exclude measurement values of these light sensors.

In the embodiment, the region formed by the light sensors, the incident ambient light of which is blocked by the operation body, are taken as an ineffective region. The ineffective region includes an operation region and a shadow region. Because the operation body may either be a finger or a palm, and the finger and the palm produce different shadows during operation, the embodiment selects different shadow algorithms according to the different shadows produced by the finger and the palm during operation. Thus, the embodiment solves the problem that the determination of the ineffective region is inaccurate by calculating the ineffective regions produced by the finger and the palm according to the same shadow algorithm. Consequently, the present embodiment can improve the accuracy in determination of the ineffective region. Methods for determining the ineffective region will be explained below.

In a first determination method, a first predetermined length which is greater than a distance from any point in the operation region to the central position of the operation region is acquired. The ineffective region including the operation region is determined according to the first predetermined length with the central position as the center.

The first predetermined length needs to be greater than the distance from any point in the operation region to the central position of the operation region, such that all the points in the operation region can be within the ineffective region. Usually, the first predetermined length may be set relatively large, for instance, the first predetermined length is set as 20 mm, or set as other numerical values. The numerical value of the first predetermined length is not limited in the embodiment.

In the embodiment, the shape of the ineffective region may also be set. For instance, the shape of the ineffective region may be a circle, an ellipse, a regular polygon, an irregular shape or the like. When the shape of the ineffective region is a circle, the first predetermined length is the length of the radius of the circle. When the shape of the ineffective region is a regular polygon, the first predetermined length is a half of the length of a diagonal line for the regular polygon.

Figure 2C:
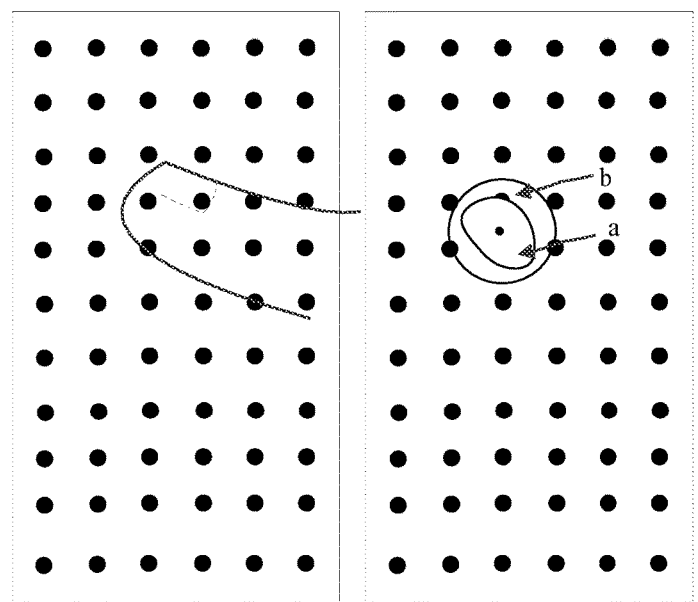
FIG. 2C is a schematic diagram showing a first ineffective region, according to another exemplary embodiment.

FIG. 2C is a schematic diagram showing a first ineffective region. In the left view of FIG. 2C, a finger of a user serving as the operation body acts on the touch screen. In the right view of FIG. 2C, a region a is the operation region of the finger, a dark spot in the region a is the central position of the operation region, and a region b may be obtained with the central position as the center and the first predetermined length as the radius. The region b is the ineffective region.

In a second determination method, the operation forces of the touch operation acting on respective contacts in the operation region are acquired, and the direction in which the operation forces descend quickest is determined as a long axis direction to generate an elliptic ineffective region. The long axis direction is the direction pointing from a first end point on the long axis to a second end point, the distance from the first end point to the operation region is smaller than the distance from the second end point to the operation region, and the elliptic ineffective region includes the operation region.

Because the shadow of the finger is elongated, an elliptic ineffective region may also be set. During implementation, a shadow region may be determined according to the direction of the finger, and then the ineffective region may be determined according to the shadow region and the operation region. The direction of the finger may be reflected by the operation forces.

Figure 2D:
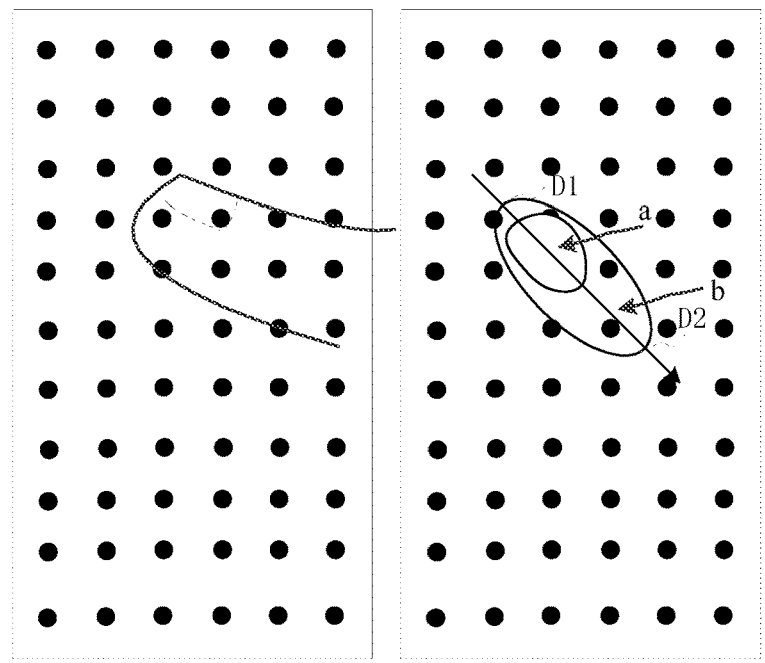
FIG. 2D is a schematic diagram showing a second ineffective region, according to another exemplary embodiment.

FIG. 2D is a schematic diagram showing a second ineffective region. In the left view of FIG. 2D, a finger of a user serving as the operation body acts on the touch screen. In the right view of FIG. 2D, a region a is the operation region of the finger. It can be known according to the direction of the finger that the direction in which the operation force descends quickest is the direction of a straight line where a first end point D1 and a second end point D2 are located. After a long axis direction is determined, an elliptic ineffective region b is generated.

In a third determination method, a second predetermined length is acquired; the second predetermined length is extended outwards along a preset direction with contacts on the boundary of the operation region as origins, and a region encircled by respective contacts is determined as the ineffective region including the operation region. The preset direction is a direction pointing from the central position of the operation region to a contact.

The second predetermined length may be set to as relatively small, for instance, the second predetermined length is smaller than the first predetermined length. When the first predetermined length is 20 mm, the second predetermined length may be set as 10 mm. Rather, the second predetermined length may be set as other numerical values. The numerical value of the second predetermined length is not limited in the embodiment.

Figure 2E:
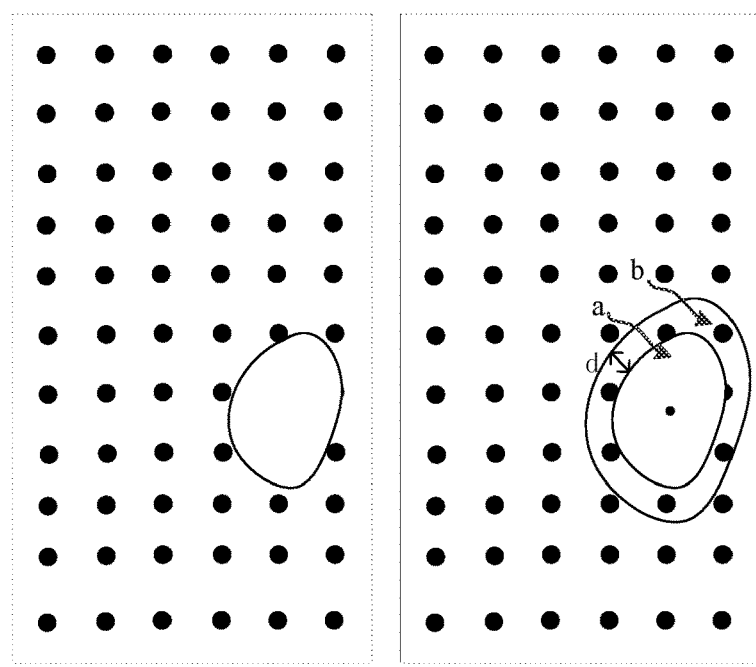
FIG. 2E is a schematic diagram showing a third ineffective region, according to another exemplary embodiment.

FIG. 2E is a schematic diagram showing a third ineffective region. In the left view of FIG. 2E, a palm of a user serving as an operation body acts on the touch screen. In the right view of FIG. 2E, a region a is the operation region of the palm, and a dark spot in the region a is the central position of the operation region. For each contact on the boundary of the operation region, a direction pointing from the central position to the contact point is determined as a predetermined direction corresponding to the contact, and the contact is outwards extended by a second predetermined length d along the predetermined direction, and then a region b encircled by respective contacts after the extending is determined as the ineffective region.

In step 202, N sampling light sensors are selected from the light sensors outside the ineffective region. For each sampling sensor to be selected, when any sampling sensor to be selected is within the ineffective region, that sampling sensor is replaced with a substitute sampling sensor outside the ineffective region. When a sampling sensor to be selected is outside the ineffective region, the sampling sensor to be selected is selected until N sampling light sensors are selected. N is an integer greater than 1.

The embodiment provides two methods for selecting the N sampling light sensors according to the ineffective region, and the two methods are respectively described below.

In a first selection method, an electronic device firstly excludes light sensors which are blocked by an operation body according to an ineffective region, and then selects N sampling light sensors from the remaining light sensors. At this time, the electronic device may either randomly select the N sampling light sensors from the remaining light sensors, or firstly determine the distribution routes of the sampling sensors and then select the N sampling light sensors along the distribution routes. The selection modes are not limited in the embodiment.

In a second selection method, the electronic device firstly determines sampling sensors to be selected according to a predetermined rule. When a sampling sensor to be selected is determined to be blocked by an operation body, a substitute sampling sensor corresponding to the sampling sensor is selected then. The ambient light incident into the substitute sampling sensor is not blocked by the operation body.

During actual implementation, the electronic device firstly determines sampling sensors to be selected according to a predetermined rule. When the light sensors are distributed on the touch screen in an array, the predetermined rule requires determining one row every q rows, and determining one sampling sensor to be selected every p light sensors in each row. Both p and q are positive integers. Because the determined sampling sensors to be selected are evenly distributed on the touch screen, the measured brightness value of ambient light is more accurate. For instance, there are 100*100 light sensors distributed on the electronic device. Provided that N is 100, the $1^{st}$, $11^{th}$, $21^{st}$, . . . , and $91^{st}$ light sensors in the $1^{st}$ row may be determined as the sampling sensors to be selected, the $1^{st}$, $11^{th}$, $21^{st}$, . . . , and $91^{st}$ light sensors in the $11^{th}$ row may be determined as the sampling sensors to be selected, . . . , and the $1^{st}$, $11^{th}$, $21^{st}$, . . . , and $91^{st}$ light sensors in the $91^{st}$ row may be determined as the sampling sensors to be selected. Thus, 100 sampling sensors to be selected are obtained.

Figure 2F:
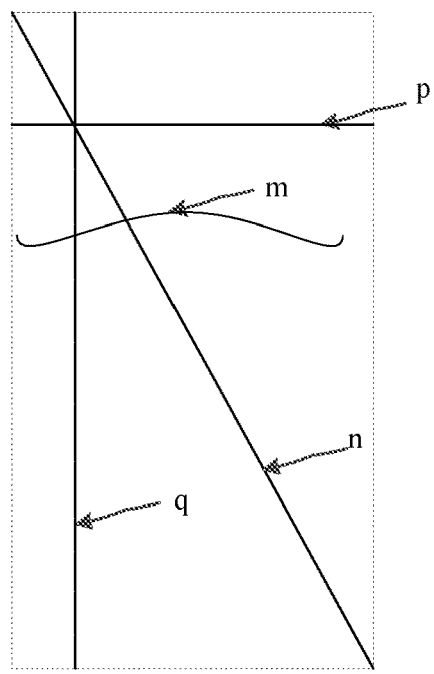
FIG. 2F is a schematic diagram showing a first line, according to another exemplary embodiment.

Or, the predetermined rule may require determining the distribution route of the sampling sensors on the touch screen, and with the route as the first line, evenly determining N sampling light sensors to be selected along the first line. The first line may either be a straight line, a polygonal line or a curve, which is not limited in the embodiment. FIG. 2F is a schematic diagram of a first line. As shown in FIG. 2F, a first line p is a transverse straight line, a first line q is a vertical straight line, a first line n is a diagonal line, and a first line m is a curve.

In the embodiment, after each sampling sensor to be selected is determined, it is also desirable to determine whether the sampling sensor to be selected is located within the ineffective region. When the sampling sensor to be selected is within the ineffective region, it is desirable to acquire a substitute sampling sensor, and the substitute sampling sensor is taken as the finally selected sampling sensor. When the sampling sensor to be selected is outside the ineffective region, acquiring the substitute sampling sensor is not needed, and the sampling sensor to be selected is directly selected as the finally selected sampling sensor.

Embodiments provide two replacement approaches for replacing the sampling sensors to be selected with the substitute sampling sensors, and the two replacement approaches are respectively described below.

In a first replacement approach, when light sensors are distributed on a touch screen in an array, a light sensor closest to the sampling sensor to be selected and outside the ineffective region is selected in a row direction or a column direction to obtain the substitute sampling sensor.

An electronic device may select a light sensor closest to the sampling sensor to be selected and outside the ineffective region in the row direction, and determine the light sensor as the substitute sampling sensor, or may select a light sensor closest to the sampling sensor to be selected and outside the ineffective region in the column direction, and determine the light sensor as the substitute sampling sensor, or may select a light sensor closest to the sampling sensor to be selected and outside the ineffective region in the row direction and select a light sensor closest to the sampling sensor to be selected and outside the ineffective region in the column direction, and determine the two light sensors as the substitute sampling sensors.

For instance, when the sampling sensor to be selected is the $20^{th}$ light sensor in the $15^{th}$ row, and the 18-$25^{th}$ light sensors in the $15^{th}$ row are located within the ineffective region, then the 17$^{th}$ light sensor in the 15$^{th}$ row may be determined as the substitute sampling sensor.

In a second replacement approach, when N sampling light sensors is selected in a predetermined direction along a first line, a second line in parallel with the first line but not intersecting with the ineffective region is determined, and a light sensor corresponding to the sampling sensor to be selected is acquired along the second line to obtain the substitute sampling sensor, or a light sensor outside the ineffective region is selected in the predetermined direction along the first line to obtain the substitute sampling sensor.

Figure 2G:
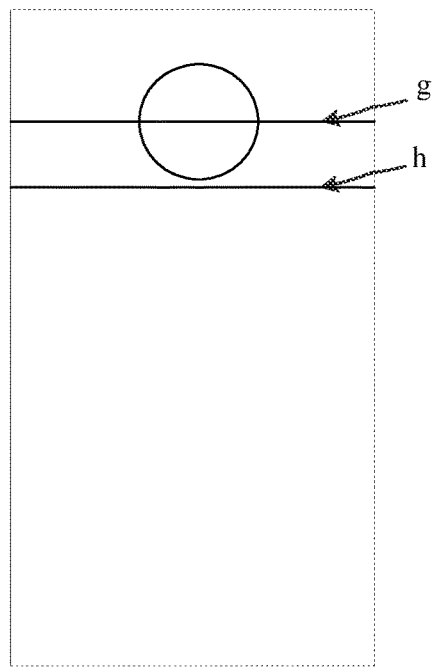
FIG. 2G is a schematic diagram showing a first line and a second line, according to another exemplary embodiment.

FIG. 2G is a schematic diagram showing a first line and a second line. A first line g is a transverse line, and an ineffective region is a circular region, then a second line h is in parallel to the first line g but does not intersect with the circular region.

For instance, when the 15$^{th}$ row is selected as the first line, the sampling sensor to be selected is the 20$^{th}$ light sensor in the first line, and the 18-25$^{th}$ light sensors in the first line are located within an ineffective region, the 20$^{th}$ row may be determined as the second line not intersecting with the ineffective region, and the 20$^{th}$ sensor in the second line is determined as the substitute sampling sensor. Alternatively, the 26$^{th}$ light sensor in the first line is determined as the substitute sampling sensor.

After the substitute sampling sensor is selected, the electronic device proceeds with the determination of next sampling sensor to be selected according to the predetermined rule until all the rest sampling sensors are selected.

When the first line and the second line exist, the electronic device may either determine next sampling sensor to be selected in the first line or determine the next sampling sensor to be selected in the second line, which is not limited in the embodiment. During the selection of sampling sensors, the probability for an operation body to re-act the touch operation on the same line is relatively small, and thus the time spent for acquiring the substitute sampling sensor again is avoided. Consequently, the selection efficiency is improved.

Optionally, the method provided by the embodiment further includes 1) jumping from the substitute sampling sensor to the sampling sensor to be selected, and selecting next sampling sensor to be selected in a predetermined direction along the first line with the sampling sensor to be selected as an origin, or 2) with the substitute sampling sensor as an origin, determining next sampling sensor to be selected in a predetermined direction along the second line.

Provided that there are nine light sensors between every two sampling sensors to be selected, it may be determined that the 30$^{th}$ light sensor in the first line is the next sampling sensor to be selected on the basis that the sampling sensor to be selected this time is the 20$^{th}$ light sensor, or, it may be determined that the 30$^{th}$ light sensor in the second line is next sampling sensor to be selected.

In step 203, the brightness of the touch screen is controlled based on the N sampling light sensors. After obtaining the N sampling light sensors, the electronic device may utilize the N sampling light sensors to measure the brightness value of ambient light, and then control the touch screen according to the brightness value of ambient light. For example, the brightness value of the touch screen and a keyboard light are controlled according to the brightness value of the ambient light.

In a first application scenario, controlling the touch screen according to the N sampling sensors includes calculating a brightness value of ambient light according to measurement values of the N sampling light sensors, and adjusting the brightness value of the touch screen according to the brightness value of the ambient light. The brightness value of the touch screen is in a positive correlation with the brightness value of the ambient light. The calculating the brightness value of the ambient light according to measurement values of the N sampling light sensors includes deleting i maximum measurement values and j minimum measurement values from the measurement values of the N sampling light sensors, and calculating an average value of remaining measurement values, and taking the average value as the brightness value of the ambient light. Both i and j are positive integers.

Because most light sources are natural light, the ambient light produced by the natural light is evenly incident into each sampling sensor, measurement values of respective sampling sensors shall be equal or approximate to each other. When the measurement value of a certain sampling sensor is too high or low, it is possible that the sampling sensor has a failure, and the measurement value at this moment is not accurate. Therefore, when measuring the brightness value of the ambient light, it is needed to exclude measurement values of these sampling sensors.

In the embodiment, measurement values may be screened firstly to delete the i maximum measurement values and j minimum measurement values among the measurement values, and then calculate the average value of the remaining measurement values. Thus, the accuracy of the brightness calculated is improved.

When deleting the i maximum measurement values and j minimum measurement values, one possible implementation is ranking all measurement values in a descending order to obtain a measurement value sequence, and delete the top i measurement values and bottom j measurement values from the measured value sequence.

In order to simplify the calculation process, the following descriptions are made with a touch screen including five sampling sensors as an example. However, it shall be noted that, during actual implementation, the number of the light sensors is far greater than five. Provided that measurement values of the five sampling sensors are N1, N2, N3, N4 and N5, respectively, and N3>N5>N2>N4>N1 and i=j=1, then the brightness value of the ambient light=(N2+N4+N5)/3.

In the embodiment, the brightness value of the touch screen may be adjusted according to the brightness value of the ambient light, so that the brightness value of the touch screen is accordingly increased when the brightness value of the ambient light is relatively large, and the brightness value of the touch screen is accordingly decreased when the brightness value of the ambient light is relatively small. Thus, the brightness value of the touch screen is adaptive to the brightness value of the ambient light to protect the eyesight of a user. The technology for adjusting the brightness value of the touch screen according to the brightness value of the ambient light is very mature, and will not be elaborated herein.

In a second application scenario, the controlling the touch screen according to the N sampling light sensors includes calculating a brightness value of ambient light according to measurement values of the N sampling light sensors, when the brightness value exceeds a predetermined threshold, controlling a keyboard light to be in an on state, and when the brightness value does not exceed the predetermined threshold, controlling the keyboard light to be in an off state.

The detailed process for calculating the brightness value of ambient light according to measurement values of the N sampling light sensors is as described above, and will not be elaborated herein.

The keyboard light provides lighting for a user while the user is inputting by the keyboard. When the brightness value of ambient light is relatively small, the user may not see the keyboard clearly and thereby cannot operate the keyboard. At this moment, the keyboard light can be controlled to be in an on state, so as to improve the operation accuracy, and when the brightness value of ambient light is relatively large, the keyboard light may be controlled to be in an off state, so as to save the electricity of the electronic device.

It shall be noted that, in addition to controlling the touch screen according to the brightness value of the ambient light, the electronic device can also utilize the positions of the light sensors blocked by the operation body to control the touch screen. For example, the method provided by the embodiment further includes determining a blocking position of the operation body according to positions of light sensors which are blocked by the operation body, and controlling the touch screen according to the blocking position.

Because the positions of the light sensors distributed on the touch screen are known, after determining the blocked light sensors, the electronic device may also determine the blocking position of the operation body, and then determine the operation position of the operation body according to the blocking position. In an application scenario, the electronic device may verify by the operation position whether the operation region obtained by measured capacitance values is accurate, so as to further improve the accuracy in determination of the operation region. In another application scenario, the electronic device may directly control the touch screen according to the operation region. For instance, the electronic device may control the touch screen to respond to the operation of the operation region. The manner for controlling the touch screen is not limited in the embodiment.

In view of the above, in the method for controlling a touch screen provided by the present disclosure, N sampling light sensors which are not blocked by an operation body are selected from the light sensors distributed on the touch screen, and the touch screen is controlled according to the N sampling light sensors. The brightness value of ambient light can be calculated according to the N accurate measurement values, and the touch screen is controlled according to the brightness value. Therefore, the present disclosure solves the problem that it is easy for one light sensor disposed in a small hole to be blocked and thereby the inaccurate measurements on the brightness value of the ambient affects the control on the touch screen. Consequently, the present disclosure can improve the accuracy in screen control.

Further, a substitute sampling sensor is obtained by selecting a light sensor closest to the sampling sensor to be selected and located outside the ineffective region in the raw direction or in the column direction. Because the determined sampling sensors are evenly distributed on the touch screen, the measured brightness value of ambient light is more accurate.

Figure 3:
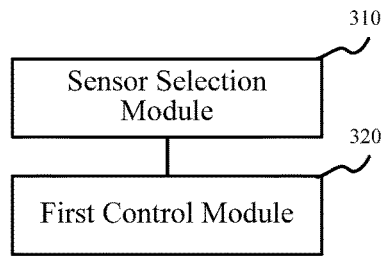
FIG. 3 is a block diagram showing a device for controlling a touch screen, according to an exemplary embodiment.

FIG. 3 is a block diagram showing a device for controlling a touch screen, according to an exemplary embodiment. The device is applied to an electronic device including a touch screen on which light sensors are evenly distributed. As shown in FIG. 3, the device for controlling a touch screen includes a sensor selection module 310 and a first control module 320.

The sensor selection module 310 is configured to select N sampling light sensors which are not blocked by an operation body from ambient light among the light sensors distributed on the touch screen. N is a natural number greater than 1.

The first control module 320 is configured to control the touch screen according to the N sampling light sensors selected by the sensor selection module 310.

In view of the above, in the device for controlling a touch screen provided by the present disclosure, N sampling light sensors which are not blocked by an operation body are selected from the light sensors distributed on the touch screen, and the touch screen is controlled according to the N sampling light sensors. The brightness value of ambient light can be calculated according to the N accurate measurement values, and the touch screen is controlled according to the brightness value. Therefore, the present disclosure solves the problem that it is easy for one light sensor disposed in a small hole to be blocked and thereby the inaccurate measurements on the brightness value of the ambient affects the control on the touch screen. Consequently, the present disclosure can improve the accuracy in screen control.

Figure 4:
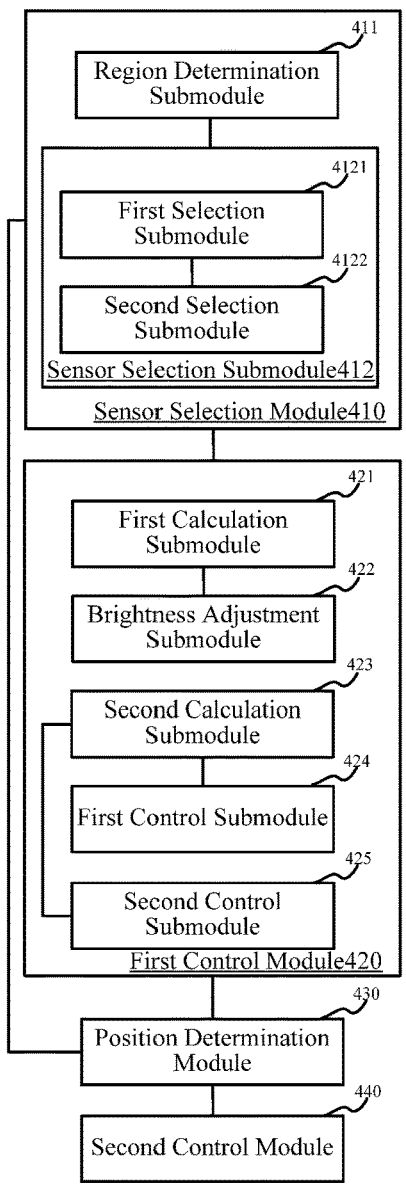
FIG. 4 is a block diagram showing a device for controlling a touch screen, according to an exemplary embodiment.

FIG. 4 is a block diagram showing a device for controlling a touch screen, according to an exemplary embodiment. The device is applied to an electronic device including a touch screen on which light sensors are evenly distributed. As shown in FIG. 4, the device for controlling a touch screen includes a sensor selection module 410 and a first control module 420.

The sensor selection module 410 is configured to select N sampling light sensors which are not blocked by an operation body from ambient light among the light sensors distributed on the touch screen. N is a natural number greater than 1.

The first control module 420 is configured to control the touch screen according to the N sampling light sensors selected by the sensor selection module 410.

Optionally, the first control module 420 includes a first calculation submodule 421 and a brightness adjustment submodule 422.

The first calculation submodule 421 is configured to calculate a brightness value of ambient light according to measurement values of the N sampling light sensors. The brightness adjustment submodule 422 is configured to adjust a brightness of the touch screen according to the brightness value of the ambient light obtained by the first calculation submodule 421. The brightness of the touch screen is in a positive correlation with the a brightness value of the ambient light.

Optionally, the first control module 420 includes a second calculation submodule 423, a first control submodule 424 and a second control submodule 425.

The second calculation submodule 423 is configured to calculate a brightness value of ambient light according to measurement values of the N sampling light sensors.

The first control submodule 424 is configured to, when the brightness value calculated by the second calculation submodule 423 exceeds a predetermined threshold, control a keyboard light to be in an on state.

The second control submodule 425 is configured to, when the brightness value calculated by the second calculation submodule 423 does not exceed the predetermined threshold, control the keyboard light to be in an off state.

Optionally, the first calculation submodule 421 is further configured to: delete i maximum measurement values and j minimum measurement values from the measurement values of the N sampling light sensors, and calculate an average value of remaining measurement values, and take the average value as the brightness value of the ambient light. Both i and j are positive integers.

Or, the second calculation submodule 423 is further configured to delete i maximum measurement values and j minimum measurement values from the measurement values of the N sampling light sensors, and calculate an average value of remaining measurement values, and take the average value as the brightness value of the ambient light.

Optionally, the device provided by the embodiment further includes: a position determination module 430 and a second control module 440.

The position determination module 430 is configured to determine a blocking position of the operation body according to positions of light sensors which are blocked by the operation body.

The second control module 440 is configured to control the touch screen according to the blocking position determined by the position determination module 430.

Optionally, the sensor selection module 410 includes a region determination submodule 411 and a sensor selection submodule 412.

The region determination submodule 411 is configured to acquire an operation region on the touch screen which the operation body acts on, and determine an ineffective region including the operation region. The ambient light incident into light sensors in the ineffective region is blocked by the operation body.

The sensor selection submodule 412 is configured to select the N sampling light sensors from light sensors outside the ineffective region, or, for each sampling sensor to be selected, when the sampling sensor to be selected is within the ineffective region, replace the sampling sensor to be selected with a substitute sampling sensor outside the ineffective region, and when the sampling sensor to be selected is outside the ineffective region, select the sampling sensor to be included in the N sampling light sensors.

Optionally, the sensor selection submodule 412 includes: a first selection submodule 4121 or a second selection submodule 4122.

The first selection submodule 4121 is configured to, when the light sensors are distributed in an array on the touch screen, select a light sensor closest to the sampling sensor to be selected and outside the ineffective region in a row direction or a column direction to obtain the substitute sampling sensor.

The second selection submodule 4122 is configured to, when sampling sensors are selected in a predetermined direction along a first line, determine a second line in parallel with the first line but not intersecting with the ineffective region, and acquire a light sensor corresponding to the sampling sensor to be selected along the second line to obtain the substitute sampling sensor, or select a light sensor outside the ineffective region in the predetermined direction along the first line to obtain the substitute sampling sensor.

In view of the above, in the device for controlling a touch screen provided by the present disclosure, N sampling light sensors which are not blocked by an operation body are selected from the light sensors distributed on the touch screen, and the touch screen is controlled according to the N sampling light sensors. The brightness value of ambient light can be calculated according to the N accurate measurement values, and the touch screen is controlled according to the brightness value. Therefore, the present disclosure solves the problem that it is easy for one light sensor disposed in a small hole to be blocked and thereby the inaccurate measurements on the brightness value of the ambient affects the control on the touch screen. Consequently, the present disclosure can improve the accuracy in screen control.

Further, a substitute sampling sensor is obtained by selecting a light sensor closest to the sampling sensor to be selected and located outside the ineffective region in the raw direction or in the column direction. Because the determined sampling sensors are evenly distributed on the touch screen, the measured brightness value of ambient light is more accurate.

With respect to the devices in the above embodiments, the specific manners for performing operations for individual modules therein have been described in detail in the embodiments regarding the methods, which will not be elaborated herein.

An exemplary embodiment of the present disclosure provides a device for controlling a touch screen, which is capable of implementing the method for controlling a touch screen provided by the present disclosure. The device for controlling a device includes: a processor and a memory for storing instructions executable by the processor. The processor is configured to select N sampling light sensors which are not blocked by an operation body from the light sensors distributed on the touch screen, and control the touch screen according to the N sampling light sensors. N is an integer greater than 1.

Figure 5:
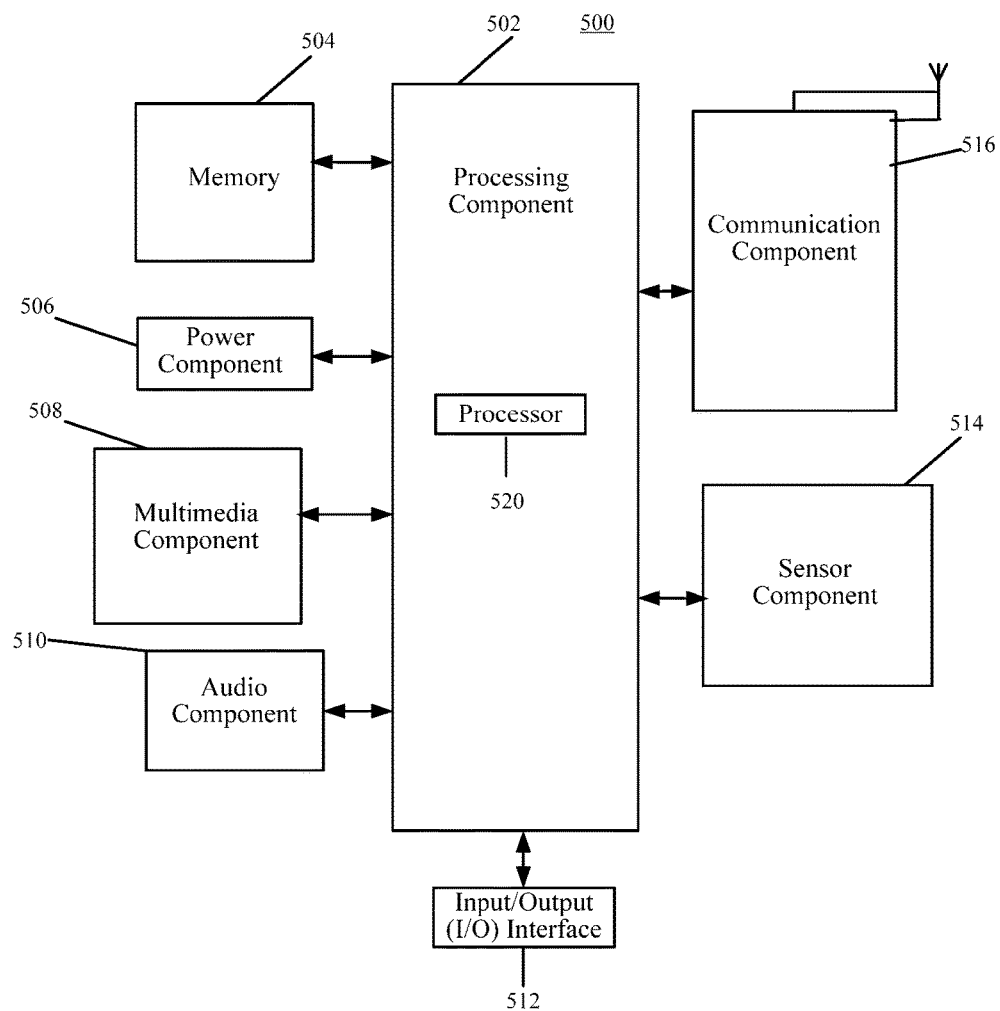
FIG. 5 is a block diagram showing a device for controlling a touch screen, according to an exemplary embodiment.

FIG. 5 is a block diagram showing a device 500 for controlling a touch screen, according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G or 3G or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

Each module discussed above, such as the sensor selection module 410 and the first control module 420, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling display brightness, the method comprising:
    controlling, by a processor, a brightness of a display based on a first group of light sensors included in a plurality of light sensors disposed in an array on the display;
    determining, by the processor, an object is operating on an operation region of the display that includes at least one of the light sensors included in the first group of the light sensors;
    identifying, by the processor, in response to determination the object is operating on the operation region, a second group of the light sensors in which receipt of ambient light is not blocked by the object, at least one of the light sensors from the first group of the light sensors included in the second group of the light sensors; and
    controlling, by the processor, the brightness of the display based on the second group of the light sensors.

2. A device for controlling display brightness comprising:
    a display including light sensors to detect ambient light disposed in an array on the display;
    a processor; and
    a memory for storing instructions executable by the processor,
    wherein the processor is configured to:
    control a brightness of the display based on a first group of the light sensors;

determine an object is operating on an operation region of the display that includes at least one of the light sensors included in the first group of the light sensors;

in response to determination the object is operating on the operation region, identify a second group of the light sensors in which receipt of ambient light is not blocked by the object, at least one of the light sensors from the first group of the light sensors included in the second group of the light sensors; and control the brightness of the display based on the second group of the light sensors.

3. The device according to claim 2, wherein to control the brightness of the display based on the second group of the light sensors, the processor is configured to:

calculate a brightness value of the ambient light based on measurement values provided by the second group of the light sensors; and adjust a brightness value of the display based on the brightness value of the ambient light, wherein the brightness value of the display is in a positive correlation with the brightness value of the ambient light.

4. The device according to claim 2, wherein the processor is further configured to:

calculate a brightness value of the ambient light based on measurement values of the second group of the light sensors;

when the brightness value exceeds a predetermined threshold, control a keyboard light of the device to be in an on state; and when the brightness value does not exceed the predetermined threshold, control the keyboard light to be in an off state.

5. The device according to claim 3, wherein the processor is configured to:

delete i maximum measurement values and j minimum measurement values from the measurement values provided by the second group of the light sensors, wherein both i and j are positive integers;

calculate an average value of remaining measurement values; and determine the average value as the brightness value of the ambient light.

6. The device according to claim 2, wherein to control the brightness of the display based on the first group of the light sensors, the processor is further configured to:

determine a blocking position of the object based on positions of light sensors from the first group of the light sensors which are blocked by the object from the ambient light; and control brightness of the display based on the blocking position.

7. A non-transitory computer-readable storage medium having stored therein a plurality of instructions executable by a processor of an electronic device, the instructions comprising:

instructions executable by the processor to control a brightness of a display based on a first group light sensors included in a plurality of light sensors for the display;

instructions executable by the processor to determine an object is operating on an operation region of the display that includes at least one of the light sensors included in the first group of the light sensors;

instructions executable by the processor to identify, in response to determination the object is operating on the operation region, a second group of light sensors in which receipt of ambient light is not blocked by the object, at least one of the light sensors from the first group of light sensors included in the second group of light sensors; and instructions executable by the processor to identify control the brightness of the display based on the second group of light sensors.

8. The device according to claim 2, wherein the display comprises a touch screen, wherein to control the brightness of the display based on the second group of the light sensors, the processor is further configured to:

calculate a brightness value of the ambient light based on measurement values of the second group of the light sensors light sensors; and adjust a brightness value of the touch screen based on the brightness value of the ambient light, wherein the brightness value of the touch screen is in a negative correlation with the brightness value of the ambient light.

9. The device according to claim 2, wherein to identify the second group of the light sensors in which receipt of ambient light is not blocked by the object, the processor is further configured to:

determining an ineffective region comprising the operation region, wherein the ambient light towards light sensors in the ineffective region is blocked by the object; and select a portion of the second group of the light sensors from the light sensors outside of the ineffective region.

10. The device according to claim 9, wherein the ineffective region is dynamically changed based on a location of the object in relation with the display.

11. The device according to claim 2, wherein to identify the second group of the light sensors in which receipt of ambient light is not blocked by the object, the processor is further configured to:

determine an ineffective region comprising the operation region, wherein the ambient light towards light sensors in the ineffective region is blocked by the object;

select the first group of the light sensors distributed on the display;

determine whether a light sensor of the first group of the light sensors is within the ineffective region; and replace the light sensor with a substitute light sensor outside the ineffective region to obtain the second group of the light sensors, the second group of the light sensors including the light substitute light sensor and light sensors from the first group that are outside of the ineffective region.

12. The device according to claim 11, wherein to replace the light sensor with the substitute light sensor outside the ineffective region, the processor is further configured to:

select, in response to the light sensors being distributed in the array on the display, as the substitute light sensor a light sensor closest to the light sensor within the ineffective region and outside the ineffective region in a row direction or a column direction of the array.

13. The device according to claim 11, wherein to replace the light sensor with the substitute light sensor outside the ineffective region, the processor is further configured to:

determine, in response to the first group of the light sensors being in a predetermined direction along a first line, a second line in parallel with the first line but not intersecting with the ineffective region; and select, as the substitute light sensor, a light sensor on the second line to be included in the second group of the light sensors, or select as the substitute light sensor a light sensor on the first line outside the ineffective region to be included in the second group of the light sensors.

14. The device according to claim 2, wherein to identify a second group of the light sensors in which receipt of ambient light is not blocked by the object, the processor is further configured to:
  identify an amount of light sensors in the first group of the light sensors that are included in the operation region; and
  include, in the second group of the light sensors, a plurality of substitute sensors totaling an amount equal to or greater than the identified amount of light sensors, the substitute light sensors not included in the first group of light sensors.

* * * * *